(12) United States Patent
Andreasson et al.

(10) Patent No.: US 8,078,468 B2
(45) Date of Patent: Dec. 13, 2011

(54) SPEECH RECOGNITION FOR IDENTIFYING ADVERTISEMENTS AND/OR WEB PAGES

(75) Inventors: Mans Folke Markus Andreasson, Lund (SE); Per Emil Astrand, Lund (SE); Erik Johan Vendel Backlund, Gantofta (SE)

(73) Assignee: Sony Ericsson Mobile Communications AB, Lund (SE)

(*) Notice: Subject to any disclaimer, the term of this patent is extended or adjusted under 35 U.S.C. 154(b) by 1108 days.

(21) Appl. No.: 11/751,170

(22) Filed: May 21, 2007

(65) Prior Publication Data
US 2008/0294436 A1 Nov. 27, 2008

(51) Int. Cl.
*G10L 21/00* (2006.01)
(52) U.S. Cl. ............... 704/270; 704/257; 704/9
(58) Field of Classification Search .................. 704/270, 704/272, 251, 255, 257, 201, 231, 235, 275, 704/270.1, 1, 3, 4, 7, 9; 709/203, 206; 707/3; 705/14; 1/1
See application file for complete search history.

(56) References Cited

U.S. PATENT DOCUMENTS

| | | | |
|---|---|---|---|
| 6,773,344 B1 | 8/2004 | Gabai et al. | |
| 7,386,443 B1* | 6/2008 | Parthasarathy et al. | 704/201 |
| 7,512,603 B1* | 3/2009 | Veteska et al. | 1/1 |
| 7,747,676 B1* | 6/2010 | Nayfeh et al. | 709/203 |
| 2001/0022788 A1 | 9/2001 | Matsubara et al. | |
| 2004/0059708 A1 | 3/2004 | Dean et al. | |
| 2007/0078708 A1 | 4/2007 | Yu et al. | |
| 2007/0112630 A1* | 5/2007 | Lau et al. | 705/14 |
| 2007/0174258 A1* | 7/2007 | Jones et al. | 707/3 |
| 2007/0266101 A1* | 11/2007 | Patel et al. | 709/206 |

FOREIGN PATENT DOCUMENTS

CN 1826596 A 8/2006

OTHER PUBLICATIONS

International Search Report and Written Opinion dated Mar. 25, 2008 issued in the corresponding PCT application No. PCT/IB2007/054714, 12 pages.

* cited by examiner

*Primary Examiner* — Huyen X. Vo
(74) *Attorney, Agent, or Firm* — Snyder, Clark, Lesch & Chung, LLP

(57) ABSTRACT

A device may identify terms in a speech signal using speech recognition. The device may further retain one or more of the identified terms by comparing them to a set of words and send the retained terms and information associated with the retained terms to a remote device. The device may also receive messages that are related to the retained terms and to the information associated with the retained terms from the remote device.

20 Claims, 13 Drawing Sheets

SPEECH RECOGNITION FOR IDENTIFYING ADVERTISEMENTS AND/OR WEB PAGES

TECHNICAL FIELD OF THE INVENTION

Implementations described herein relate to speech processing, and in particular, relate to using words that are recognized in speech recognition.

DESCRIPTION OF RELATED ART

With advent of fast processors, it has become possible to perform effective speech recognition in small devices and/or personal computers. Examples of speech recognition applications include voice-triggered dialing, voice-triggered data entry, dictation, and controlling appliances with voice commands.

SUMMARY

According to one aspect, a method may include identifying terms in a speech by applying a speech recognition method to a speech signal, retaining one or more of the identified terms by comparing the identified terms to filtering terms, sending the retained terms and information associated with the retained terms to a remote device, and receiving messages related to the retained terms and to the information associated with the retained terms from the remote device.

Additionally, retaining one or more of the identified terms may include comparing the identified terms to the filtering terms, and eliminating from the identified terms a word in the filtering terms.

Additionally, retaining one or more of the identified terms may include comparing the identified terms to the filtering terms, and retaining words in the identified terms if the words are among the filtering terms.

Additionally, sending the retained terms and information associated with the retained terms to a remote device may include sending the retained terms and times at which the terms is identified to the remote device.

Additionally, sending the retained terms and information associated with the retained terms to a remote device may include sending the retained terms and names of locations at which the retained terms are identified to a remote device that retrieves advertisements based on the retained terms and the names of the locations.

Additionally, applying a speech recognition method may include using a Hidden Markov model to recognize terms in the speech signal.

Additionally, the method may further comprise storing the retained terms and the information associated with the retained terms in a database.

Additionally, the method may further comprise removing the retained terms and the information after a predetermined period of time from the database.

Additionally, receiving messages may include receiving advertisements related to the retained terms and to the information associated with the retained terms Additionally, receiving messages may include receiving from the remote device email messages that contain advertisements, links, or bookmarks that are related to the retained terms and to the information associated with the retained terms.

Additionally, receiving messages may include receiving results of performing a search with keywords at a search engine, the keywords being related to the retained terms.

According to another aspect, a device may comprise a word recognition engine that identifies terms in a stream of information received at the device, a word filter that filters portions of the identified terms, a word storing unit that stores the filtered terms and information associated with the identified terms, and a processor. The processor may be configured to send the stored terms and information associated with the terms to a remote device, and receive messages related to the filtered terms and to the information associated with the terms from the remote device.

Additionally, the word filter may include at least one of a filter that eliminates, among the identified terms, terms that match a predetermined set of terms or a filter that retains, among the identified terms, terms that match a predetermined set of terms.

Additionally, the messages may include advertisements that are retrieved based on keywords that are derived from the stored terms or results of performing a search based on keywords that are derived from the stored terms.

Additionally, the results of performing the search may include a list of uniform resource locators or bookmarks.

Additionally, the messages may include at least one of email messages, web pages, voice mails, or video messages.

Additionally, the processor may be further configured to remove the stored terms and the information associated with the stored terms after a predetermined period of time.

Additionally, the information associated with the stored terms may include times at which the terms are identified or physical locations of the device when the terms are identified.

Additionally, the word recognition engine may include at least one of a speech recognition engine, an email recognition engine, or an instant message recognition engine.

According to yet another aspect, a device may comprise means for identifying terms in a speech by applying speech recognition to a speech signal, means for retaining portions of the identified terms by comparing them to a set of words, means for sending the retained portions and times associated with the retained portions to an advertisement server, and means for receiving from the advertisement server advertisements that are related to the retained portions and to the information associated with the retained portions.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements. Also, the following detailed description does not limit the invention.

Overview

In implementations described herein, a user's speech may be monitored and processed for identifying significant terms (e.g., words). Each significant term and the time and/or the location at which the significant term has been identified may be stored in a database. Periodically or on demand, the stored terms may be retrieved from the database and conveyed to an application (e.g., an advertisement server). The application may use the conveyed information to compile and/or retrieve advertisements, and send the advertisements to the user. Alternatively, the application may use the information to perform searches and make results of the searches available to the user.

The term "browser," as used herein, may refer to a software application that allows a user to interact with resources located on a network (e.g., websites or hosts on the Internet).

The term "search engine" as used herein may refer to a system for finding information in a network or in a computing system. The search engine may accept search terms (e.g., text, images, and/or sounds) and return a "search result" (i.e., a list of one or more items that match the search terms). In many contexts, a "search" may entail inputting the search terms at a browser that may send the terms to the search engine over a network.

The term "time" at which a word is identified may include time of day, day of week, day of month, and/or any piece of information that pertain to chronological information that designates a moment at which the word is identified.

The term "term" or "word," as used herein, may be used interchangeably and may refer to words and/or any string of delimited characters that convey meaning.

Exemplary System Configuration

Figure 1:
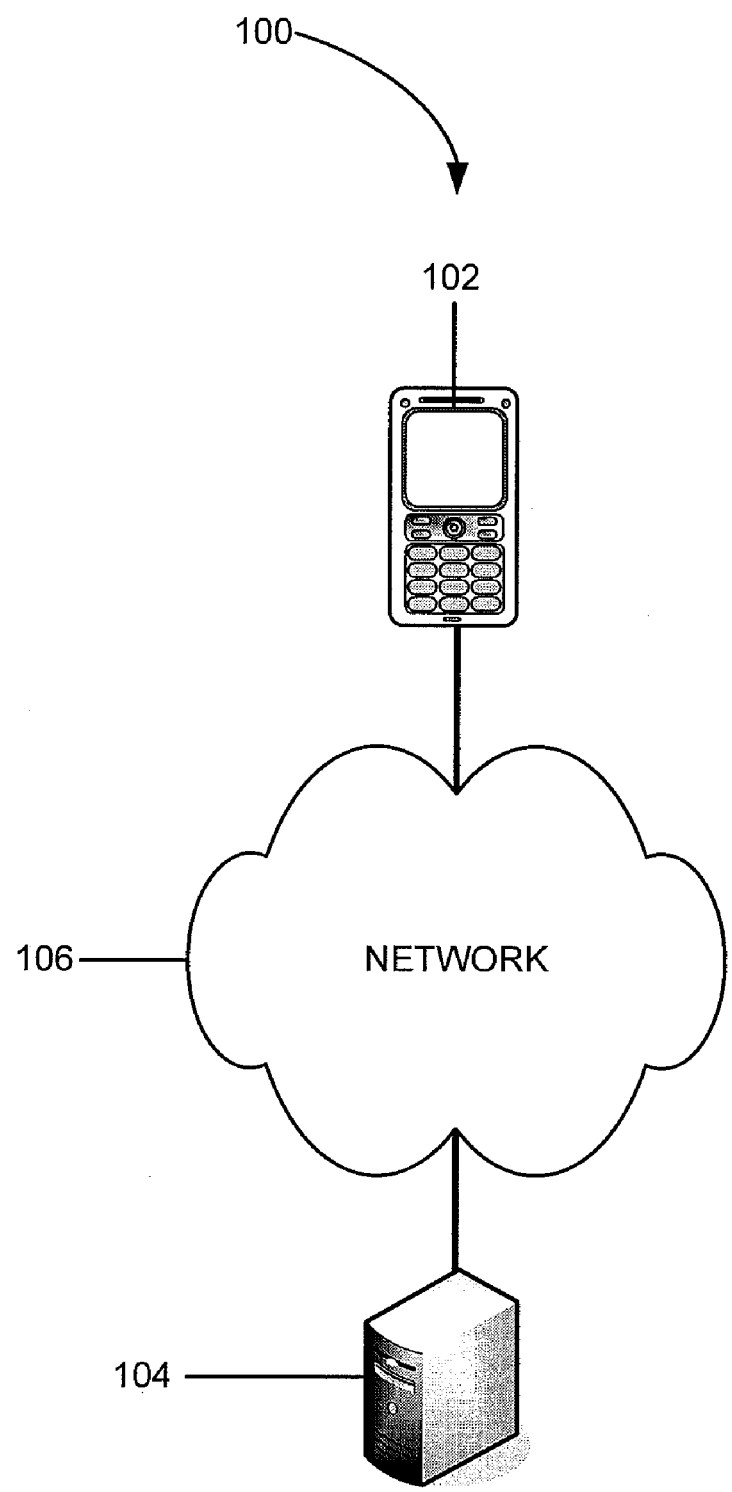
FIG. 1 shows a system in which concepts described herein may be implemented.

FIG. 1 shows an exemplary system in which concepts described herein may be implemented. As shown, system 100 may include a client device 102, a server device 104, and a network 106. In other implementations, system 100 may include additional, fewer, or different components. Moreover, one or more components of system 100 may perform one or more functions of another component of system 100.

Client device 102 may include any of the following devices: a personal computer; a telephone, such as a radio telephone; a personal communications system (PCS) terminal that may combine cellular radiotelephone with data processing, facsimile, and/or data communications capabilities; a mobile telephone; an electronic notepad; a laptop; a personal computer (PC); a personal digital assistant (PDA) that can include a radiotelephone, pager, Internet/intranet access, web browser, organizer, calendar, global positioning system (GPS) receiver; or another type of computation or communication device, a thread or process running on one of these devices, and/or an object executable by one of these devices.

Server device 104 may include one or more computer systems for hosting server programs and/or applications. Server device 104 may receive data or information from client applications that may be hosted by client device 102, may process the data/information, and may transmit data/information to client device 102.

Network 106 may include the Internet, an ad hoc network, a local area network (LAN), a wide area network (WAN), a metropolitan area network (MAN), a cellular network, a public switched telephone network (PSTN), any other network, or a combination of networks. Client device 102 may communicate with server device 104 or other devices in network 106 through a wireless or wire communication link.

Exemplary Devices

Figure 2:
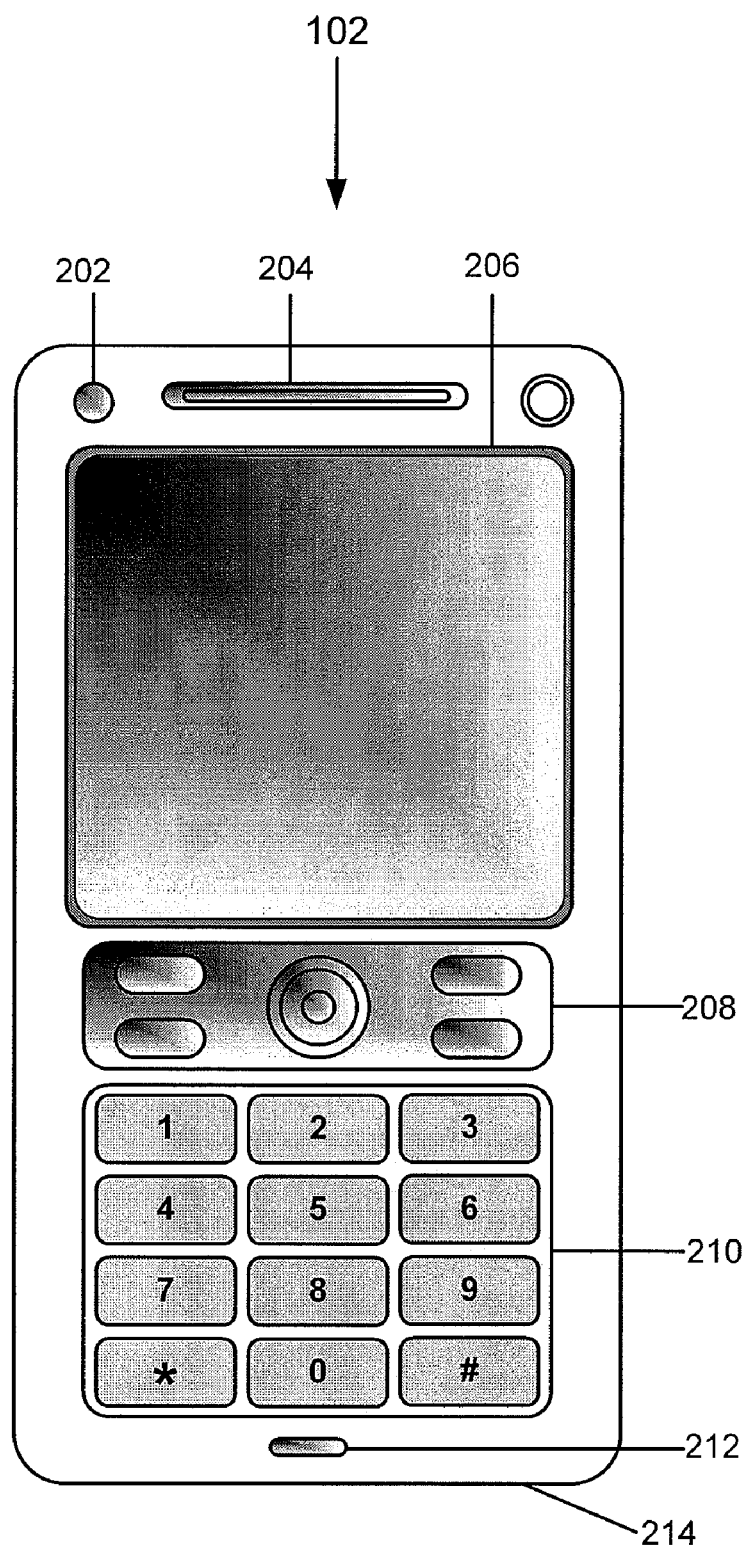
FIG. 2 is an exemplary diagram of a client or server device of FIG. 1.

FIG. 2 is an exemplary diagram of client device 102. As illustrated, client device 102 may include a camera 202, a speaker 204, a display 206, control buttons 208, a keypad 210, a microphone 212, and a housing 214. Camera 202 may enable a user to view, capture and store media (e.g., images, video clips) of a subject in front of device 102. Speaker 204 may provide audible information to a user of client device 102. Display 206 may include a display screen to provide visual information to the user, such as video images or pictures, and may include a touch screen (e.g., a capacitive screen, near field screen) to accept inputs from a user. Control buttons 208 may permit the user to interact with client device 102 to cause client device 102 to perform one or more operations, such as place or receive a telephone call. Keypad 210 may include a standard telephone keypad. Microphone 212 may receive audible information from the user. Housing 214 may provide a casing for components of client device 102 and may protect the components from outside elements.

Figure 3:
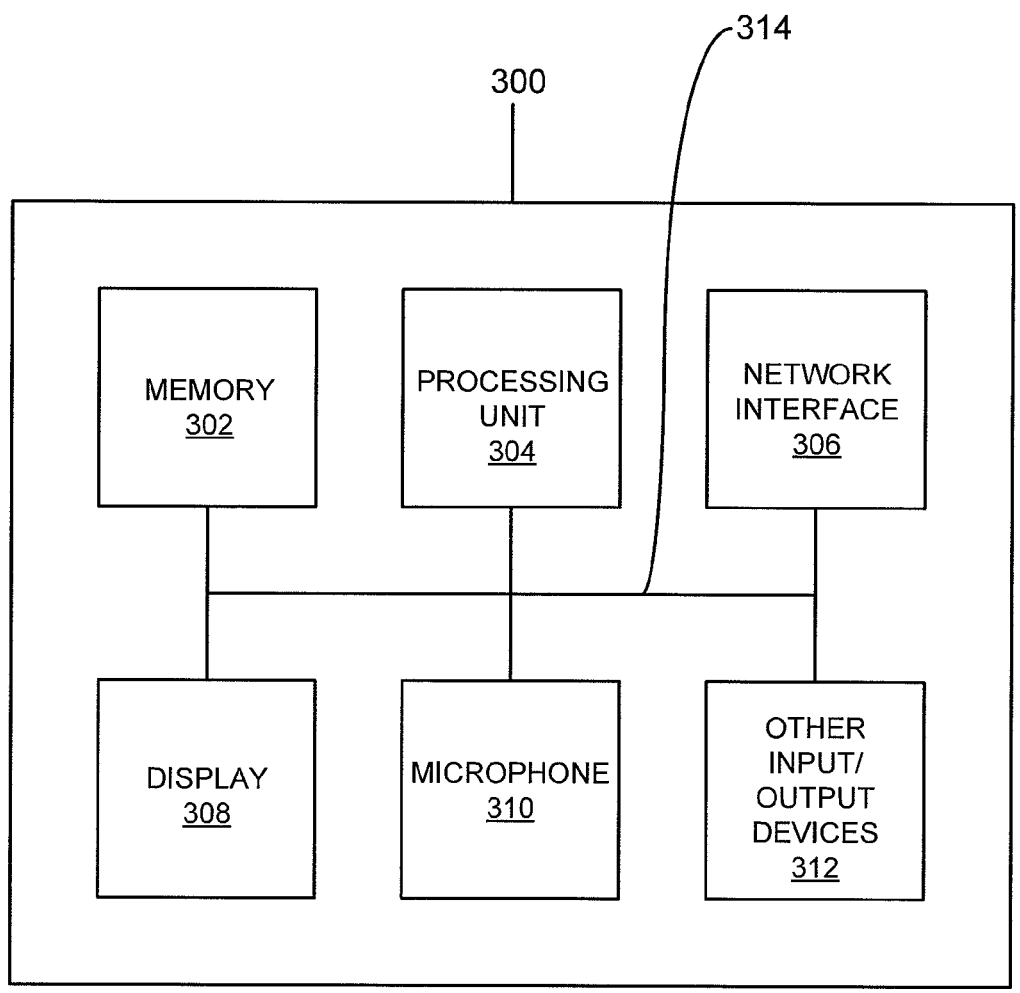
FIG. 3 is an exemplary block diagram of the client device of FIG. 1.

FIG. 3 shows an exemplary block diagram of a device 300. Device 300 may represent client device 102 or server device 104. As shown, device 300 may include memory 302, a processing unit 304, a network interface 306, a display 308, a microphone 310, other input/output devices 312, and a bus 314. Depending on implementation, device 300 may include additional, fewer, or different components. For example, if device 300 represents client device 102, device 300 may include a global positioning system (GPS) receiver. In another example, if device 300 represents server device 104, device 300 may include multiple central processors.

Memory 302 may include static memory, such as a read only memory (ROM), and/or a dynamic memory, such as a random access memory (RAM), or an onboard cache, for storing data and machine-readable instructions. Memory 302 may also include storage devices, such as a floppy disk, CD ROM, CD read/write (R/W) disc, and/or flash memory, as well as other types of storage devices. Processing unit 304 may include one or more processors, microprocessors, and/or processing logic capable of controlling device 300.

Network interface 306 may include any transceiver-like mechanism that enables device 300 to communicate with other devices and/or systems. For example, network interface 306 may include mechanisms for communicating via a network, such as the Internet, a cellular network, a terrestrial wireless network (e.g., wireless local area network (WLAN)), a satellite-based network, etc. Additionally or alternatively, network interface 306 may include a modem, an Ethernet interface to a local area network (LAN), and/or an interface/connection for connecting device 300 to other devices (e.g., a Bluetooth interface). Further, network interface 306 may include receivers, such as a Global Positioning System (GPS) receiver for providing locations of client device 102.

Display 308 may include a device that can display signals generated by device 300 as text or images on a screen (e.g., a liquid crystal display (LCD), cathode ray tube (CRT) display, organic light-emitting diode (OLED) display, surface-conduction eletro-emitter display (SED), plasma display, field emission display (FED), bistable display, etc.) and a touch screen or a panel-enabled display that may function as a user input interface. For example, display 308 may include a pressure-sensitive (e.g., resistive), near field-sensitive (e.g., capacitive), acoustically-sensitive (e.g., surface acoustic wave), photo-sensitive (e.g., infra-red), and/or any other type of display overlay that allows display 308 to be used as an input device.

Microphone 310 may receive audible information from the user and relay the audible information to processing unit 304 to be processed. An example of microphone 310 may include microphone 212.

Other input/output devices 312 may include a keyboard, a keypad (e.g., keypad 210 of FIG. 2), one or more buttons (e.g., control buttons 208), a mouse, a speaker (e.g., speaker 204), a Digital Video Disk (DVD) writer, a DVD reader, Universal Serial Bus (USB) lines, and/or other types of devices for converting physical events or phenomena to and/or from digital signals that pertain to device 300. Bus 312 may provide an interface through which components of device 300 can communicate with one another.

Figure 4:
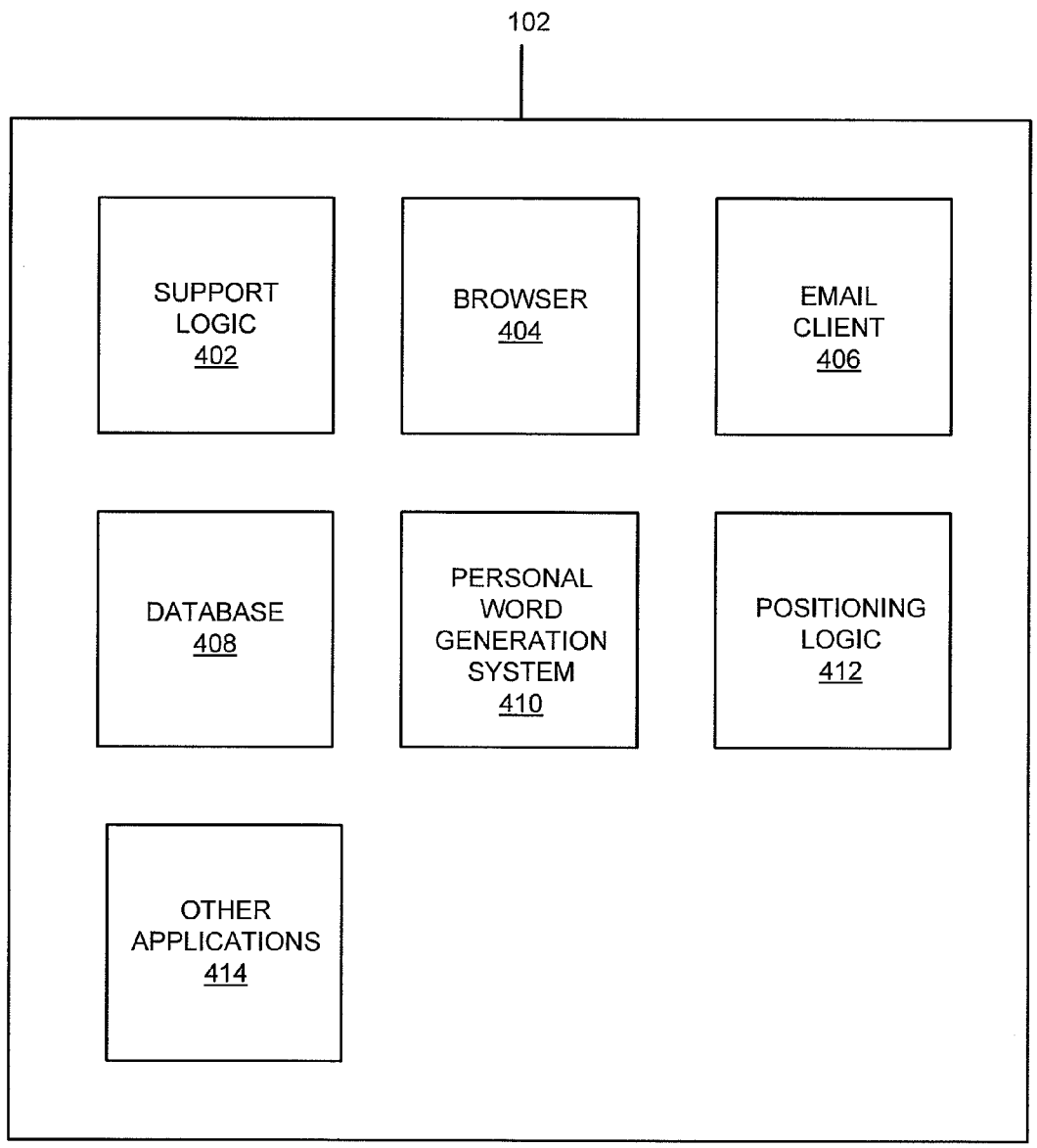
FIG. 4 is an exemplary functional block diagram of exemplary components of the client device of FIG. 1.

FIG. 4 is a functional block diagram of exemplary components of client device 102. As shown, client device 102 may include support logic 402, a browser 404, an email client 406, a database 408, a personal word generation system 410, positioning logic 412, and/or other applications 414. In other implementations, client device 102 may include fewer, additional, or different types of components than those illustrated in FIG. 4.

Support logic 402 may include hardware and/or software for performing various support functions for other components in FIG. 4 (e.g., browser 404, email client 406, other applications 414). For example, support logic 402 may provide interfaces between the components illustrated in FIG. 4 (e.g., other applications 414) and the components in FIG. 3 (e.g., network interface 306, display 308, microphone 310, and input/output devices 312). In yet another example, support logic 402 may provide a Transmission Control Protocol (TCP)/Internet Protocol (IP) stack to support communication applications, such as browser 404.

Browser 404 may include a software application that allows a user to interact with web resources at websites or hosts. In FIG. 1, a user may use browser 404 to visit and/or to interact with websites in network 106. In addition, the user may use browser 404 to view search results and/or advertisements that are received at client device 102 from server device 104. Browser 404 may, for example, be implemented by processing unit 304 using instructions stored in memory 302.

Email client 406 may include a software application that is used to receive, compose, and/or send email. In FIG. 1, email client 406 may receive messages that contain links to websites or web resources from server device 104. In addition, email client 406 may receive messages that include advertisements that are tailored to the user.

Database 408 may act as an information repository for browser 404, email client 406, personal word generation system 410, and/or other applications 414. For example, browser 404 may store web pages of recently visited sites in database 408. In another example, personal word generation system 410 may store and/or retrieve words that have been recognized by a speech recognition engine.

Personal word generation system 410 may include hardware and/or software that accepts signals from microphone 310, recognizes words in the signals, filters the words for significant terms, stores, retrieves, and/or dispenses the significant terms to/from database 408. Personal word generation system 410 may store and/or retrieve, for each significant term, the time and the location at which the term has been extracted. For example, if a user utters a sentence "I went shopping at XYZ yesterday" into microphone 310 at 14:00 p.m. at place Z, personal word generation system 410 may recognize the words in the sentence, may filter the words for "shopping" and "XYZ," and may store terms "shopping" and "XYZ" along with time 14:00 p.m. and/or place Z in database 408. Based on a request from server device 104 or based on a certain schedule, personal word generation system 410 may retrieve and dispense the terms, the times, and/or locations associated with the terms to server device 104 (FIG. 1) for further processing.

Positioning logic 412 may include hardware and/or software for obtaining the physical location of client device 102. Positioning logic 412 may obtain information related to the physical location from other components of client device 102, such as a GPS receiver. Other applications 414 may include hardware and/or software for supporting various functionalities of client device 102, such as text messaging, Multimedia Messaging, wireless communications (e.g., Bluetooth), image capturing and storing, infrared communications, driving a speaker with sound signals, file uploading and downloading, image transfer, etc.

Figure 5:
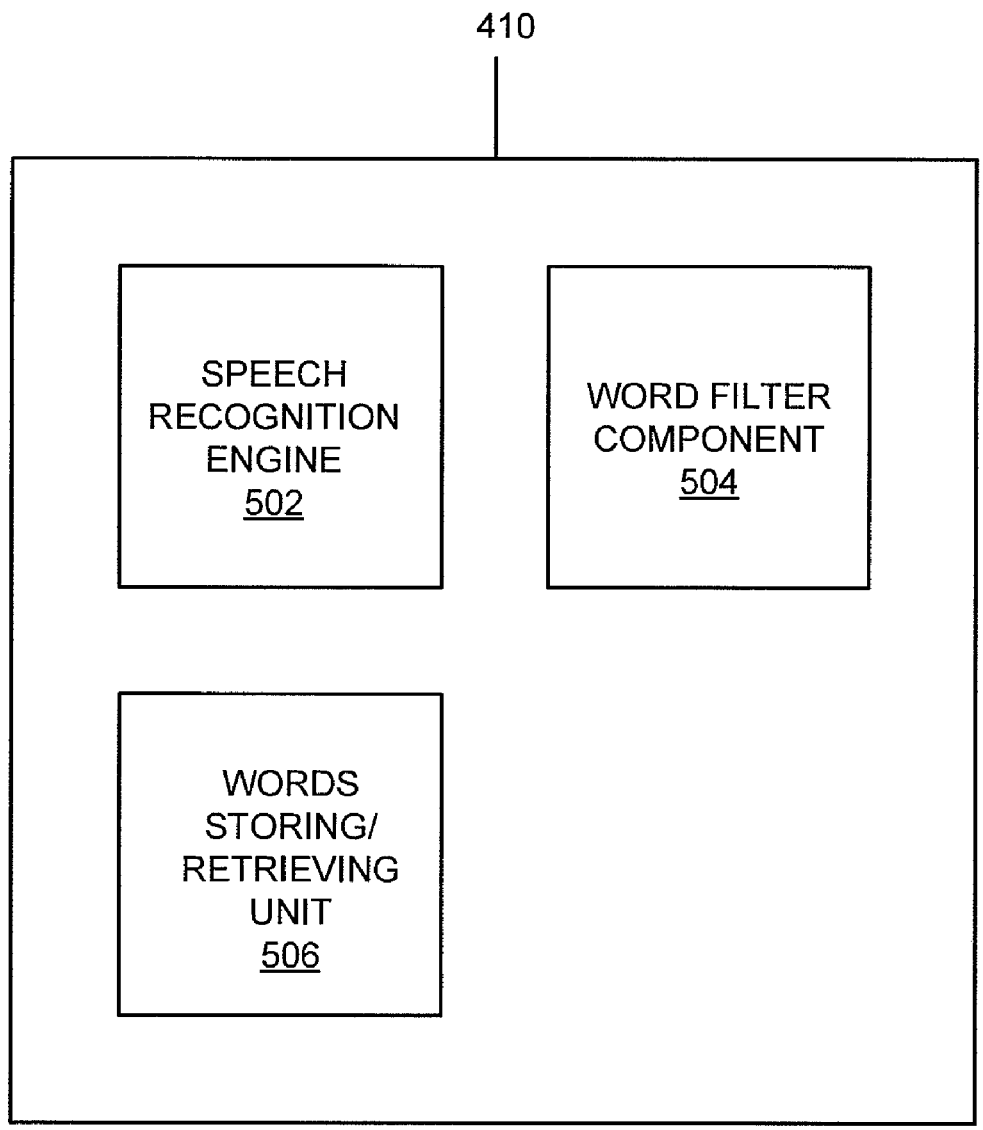
FIG. 5 is an exemplary functional block diagram of a personal word generation system of FIG. 4.

FIG. 5 is an exemplary functional block diagram of personal word generation system 410. As shown, personal word generation system 410 may include a speech recognition engine 502 a word filter component 504, and a word storing/retrieving unit 506. In other implementations, personal word generation system may include fewer, additional, or different components than the ones shown in FIG. 5. For example, personal word generation system 410 may include a database of common words that may be filtered out from words that are recognized in speech.

Speech recognition engine 502 may include hardware and/or software for processing speech signals that are received from microphone 310. Speech recognition engine 502 may output words that it identifies and the times and locations at which it identifies each word. Speech recognition engine 502 may employ one or more existing techniques for recognizing a sequence of words in a speech, including ones that use neural networks, Hidden Markov model, dynamic time warping (DTW) for detecting similarities between signals, etc. Speech recognition engine 502 may, in some implementations, accept training signals to increase the accuracy and speed of speech recognition.

Word filter component 504 may include hardware and/or software for filtering words that are output from speech recognition engine 502, and may convey the filtered words to words storing/retrieving unit 506. In determining the words that are to be retained during filtering, word filter component 504 may compare the identified words from speech recognition engine 502 to a predetermined set of words. In other implementations, word filter component 504 may filter out common words, such as, for example, prepositions (e.g., "to,"

"into," "at," etc.) or conjunctions (e.g., "and," "or," etc.), etc. In still other implementations, word filter component 504 may rejects words that are designated as private by a user of client device 102 (e.g., names).

Word storing/retrieving unit 506 may include hardware and/or software for storing and retrieving the filtered words, the times and the locations at which the words are identified, and the number of times each word is identified in database 408. Word storing/retrieving unit 506 may store and/or retrieve words and corresponding times and/or locations based on requests from other components (e.g., word filter component 504, server device 104 (FIG. 1), etc.) or based on a certain schedule. In addition, word storing/retrieving unit 504 may retrieve words based on time windows (e.g., between 2-3:00 p.m. at $2^{nd}$ day of each month), a geographical region (e.g., Lund, Sweden), and/or other combination of time/location patterns (e.g., 10 most commonly uttered words from 2:00-4:00 p.m. on Thursday within 2 kilometers of location X) that are requested. In one implementation, word storing/retrieving unit 506 may discard the words after a certain duration (e.g., a day, a week, etc.), in order to keep information in database 408 up-to-date. In other implementations, the word storing/retrieving unit 506 may collect words over a long time to obtain a comprehensive user profile of words that are commonly used.

Figure 6:
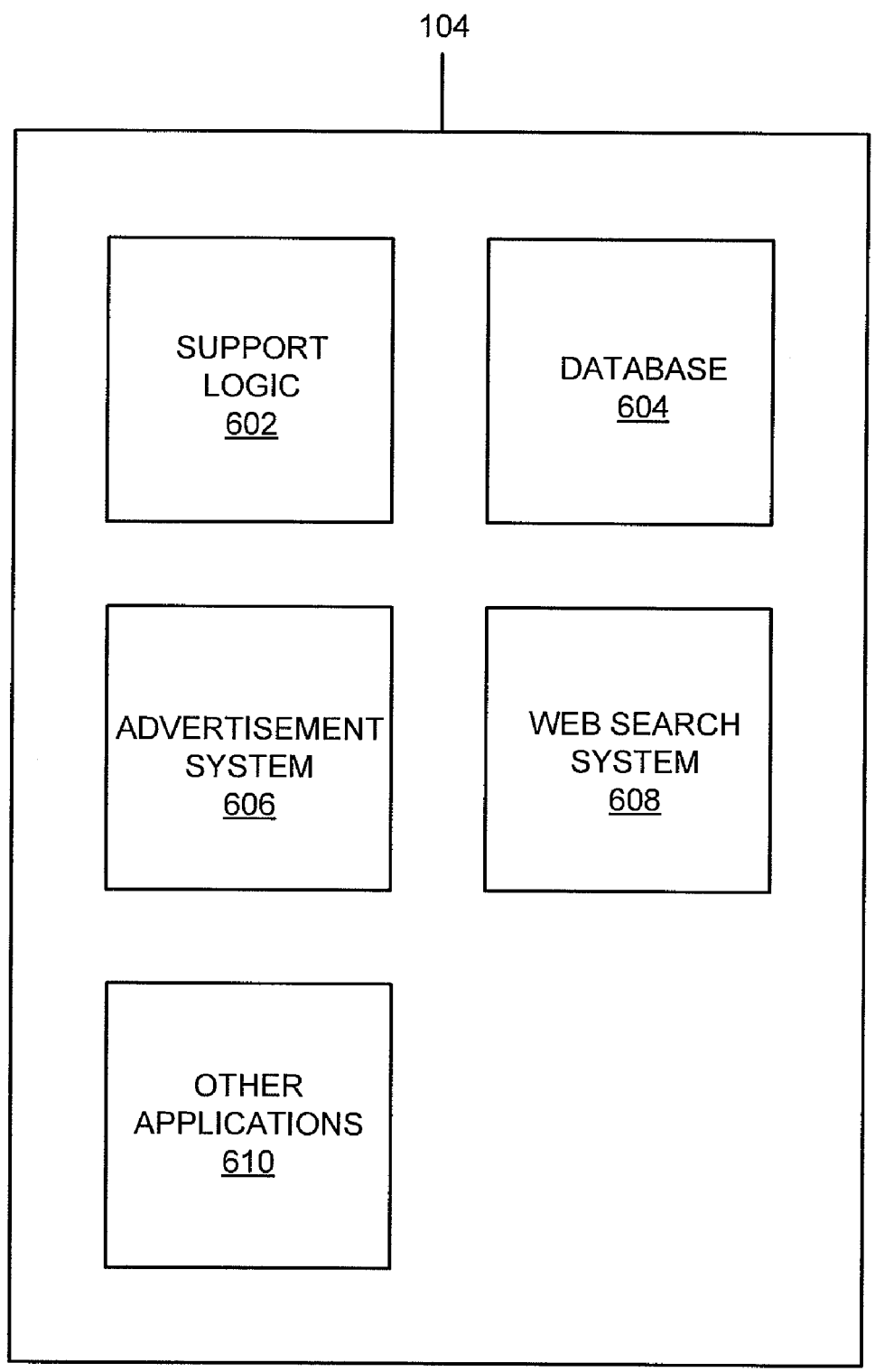
FIG. 6 is an exemplary functional block diagram of exemplary components that may be included in a server device of FIG. 1.

FIG. 6 is a functional block diagram of exemplary components of server device 104. As shown, server device 102 may include support logic 602, a database 604, an advertisement system 606, a web search system 608, and other applications 610. In some implementations, the components may be distributed over many server devices. In other implementations, server device 104 may include fewer, additional, or different types of components than those illustrated in FIG. 6. For example, in one implementation, server device 104 may include advertisement system 606 and exclude web search system 608, or may include web search system 608 and exclude advertisement system 606.

Support logic 602 may include hardware and/or software for performing various support functions for other components of FIG. 6 (advertisement system 606, web search system 608, and other applications 610). Database 604 may act as an information repository for advertisement system 606, web search system 608, and/or other applications 610. For example, database 604 may retrieve information that may be combined to form an advertisement. In another example, database 604 may store links (e.g., Uniform Resource Locators (URLs)) that have been collected by web search system 608. In yet another example, database 604 may store information about client devices (e.g., network addresses, email addresses, phone numbers, etc.) that are requesting services from one or more components in FIG. 6 (e.g., advertisement system 606).

In one implementation, for each client device 102 that is serviced by server device 104, database 604 may collect, periodically or based on an event (e.g., client device 102 contacting server device 104), filtered words that are recorded in database 408 of client device 102 and/or the times and locations at which the filtered words are identified at client device 102. In one implementation, database 604 may discard the words after a certain duration (e.g., a day, a week, etc.) in order to keep information up-to-date. In other implementations, database 604 may collect words over a long time period to obtain a comprehensive user profile.

Advertisement system 606 may include hardware and/or software for receiving information from words storing/retrieving unit 506 in client device 102 or from database 604, for compiling advertisements based on the received information, and for sending the advertisements to client device 102.

Web search system 608 may include hardware and/or software for receiving information from words storing/retrieving unit 506 in client device 102 and/or from database 604, for conducting searches in a network, based on the received information. Web search system 608 may send search results to client device 102. Other applications 610 may include hardware and/or software for supporting various functionalities of server device 104, such as serving email messages, serving web pages, serving files, etc.

Figure 7:
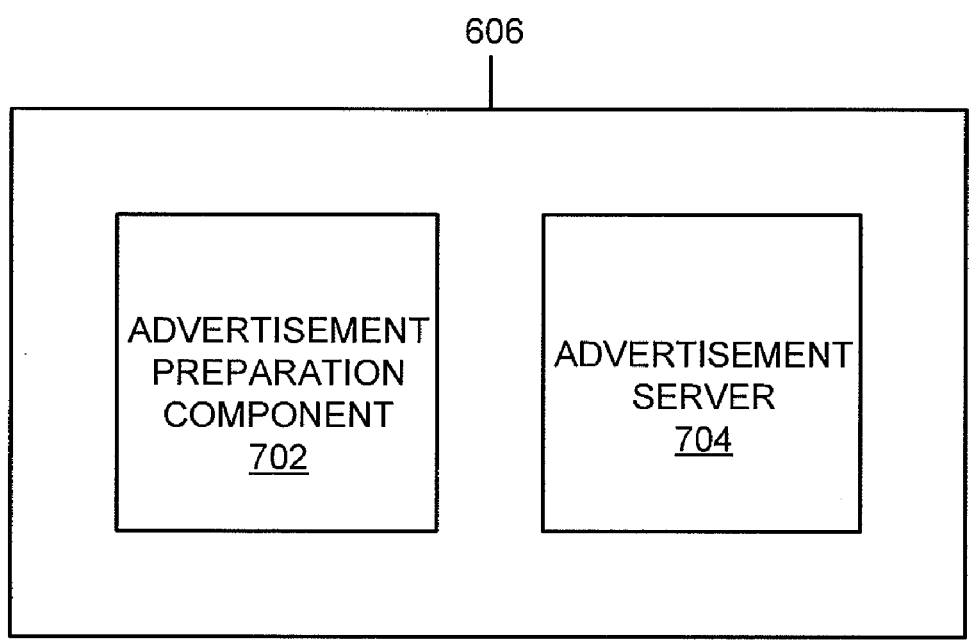
FIG. 7 is an exemplary functional block diagram of an advertisement system of FIG. 6.

FIG. 7 is an exemplary functional block diagram of advertisement system 606. As shown, advertisement system 606 may include an advertisement preparation component 702 and an advertisement server 704. In other implementations, advertisement system 606 may include additional, fewer, and/or different components than those illustrated in FIG. 7.

Advertisement preparation component 702 may include hardware and/or software for requesting and/or receiving filtered words and times and/or locations at which the words are identified from client device 102. In addition, advertisement preparation component 702 may include hardware and/or software for obtaining a set of keywords based on the received words.

The keywords may be selected from the received words in a number of different ways. In one implementation, for example, the keywords may be determined by selecting the top five most spoken words in the received words that have been identified within a specified period of time at client device 102. In another implementation, the keywords may be determined partly based on the names of geographical locations that are close (e.g., within 1 kilometer) to the locations at which the received words have been identified.

Advertisement server 704 may include hardware and/or software for compiling a set of advertisements based on the keywords and/or the locations that are associated with the keywords. For example, if the keywords include the term "restaurant" that is uttered at place Z, advertisement server 704 may prepare and/or assemble advertisements of restaurants that are near place Z. In one implementation, the advertisements may be assembled from video clips, text, picture, and/or other relevant information that are stored in database 604. In yet another implementation, the advertisements may retrieved from database 604 by searching database 604 with the keywords.

Advertisement server 704 may send the compiled advertisements to client device 102. The advertisements may be sent as an email message, a web page, a voice message, a video message, an applet, and/or any other form of message. The information may be sent at different times, and in one implementation, the information may be sent about the time of day when keywords have been identified at client device 102. In another implementation, a user's current location information may be used to further narrow the list of advertisements that may be sent to the user.

Figure 8:
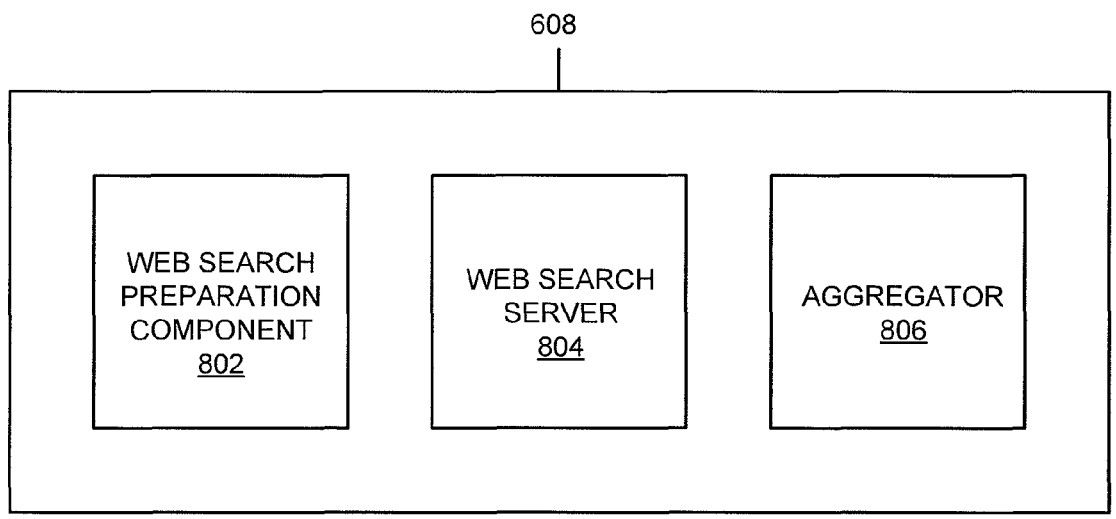
FIG. 8 is an exemplary functional block diagram of a web search system of FIG. 6.

FIG. 8 is an exemplary functional block diagram of web search system 608. As shown, web search system 608 may include a web search preparation component 802, a web search server 804, and an aggregator 806. In other implementations, web search system 608 may include additional, fewer, and/or different components than those illustrated in FIG. 8.

Web search preparation component 802 may include hardware and/or software for requesting and/or receiving filtered words and times and/or locations at which the words are identified at speech recognition engine 502, from words storing/retrieving unit 506 in client device 102 or from database 604. In addition, web search preparation component 802 may include hardware and/or software for obtaining a set of keywords based on the filtered words.

The keywords may be selected from the filtered words in a number of different ways. In one implementation, for example, the keywords may be determined based on both the filtered words and the names of geographical locations that are near the locations at which the filtered words have been identified.

Web search server 804 may include hardware and/or software for performing a search based on the keywords. In one implementation, web search server 804 may include a search engine that searches database 604 for content. In another implementation, web search server 804 may submit a search request that includes the keywords to a search engine in network 106 (FIG. 1). The search result may include links (e.g., URLs) or embedded content (e.g., text, article, picture, etc.), RSS feeds, etc.

Aggregator 806 may include hardware and/or software for receiving results of the search request made by web search server 804, formatting the information in an email message or as a web page, and sending the formatted information to client device 102.

Exemplary Processes for Performing and Using Speech Recognition

Figure 9:
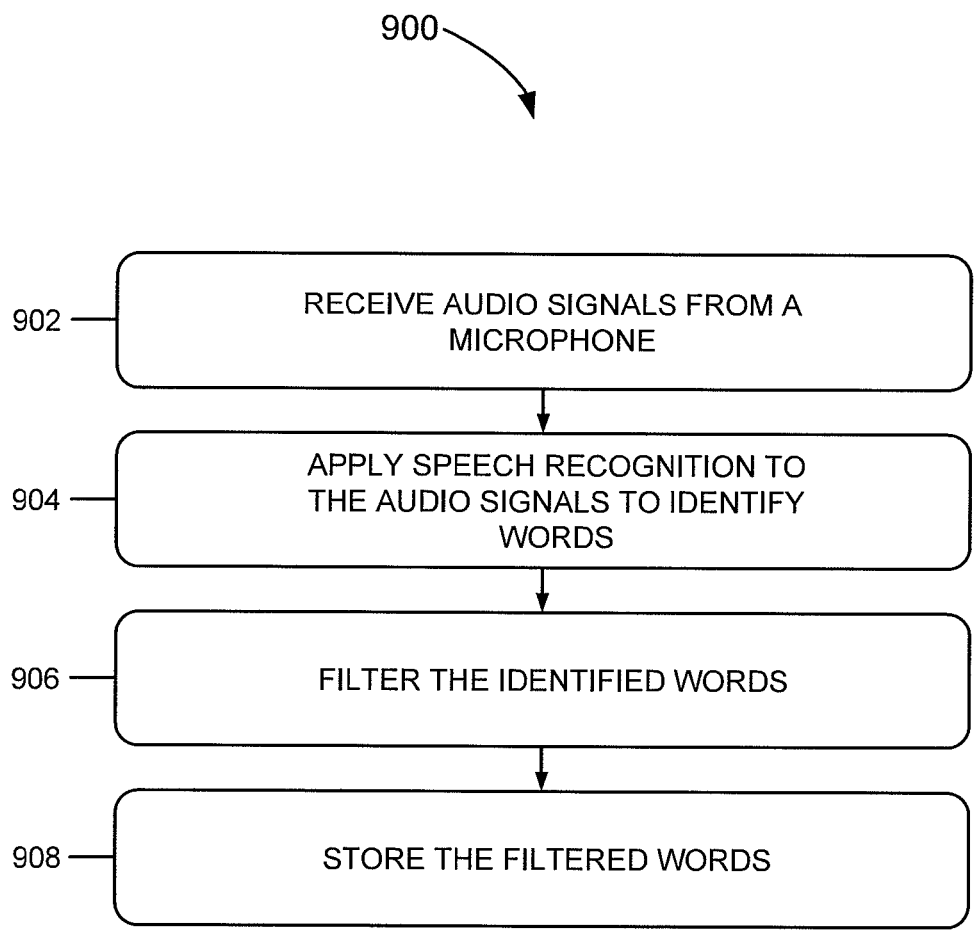
FIG. 9 is a flowchart of an exemplary process for performing speech recognition.
Figure 10:
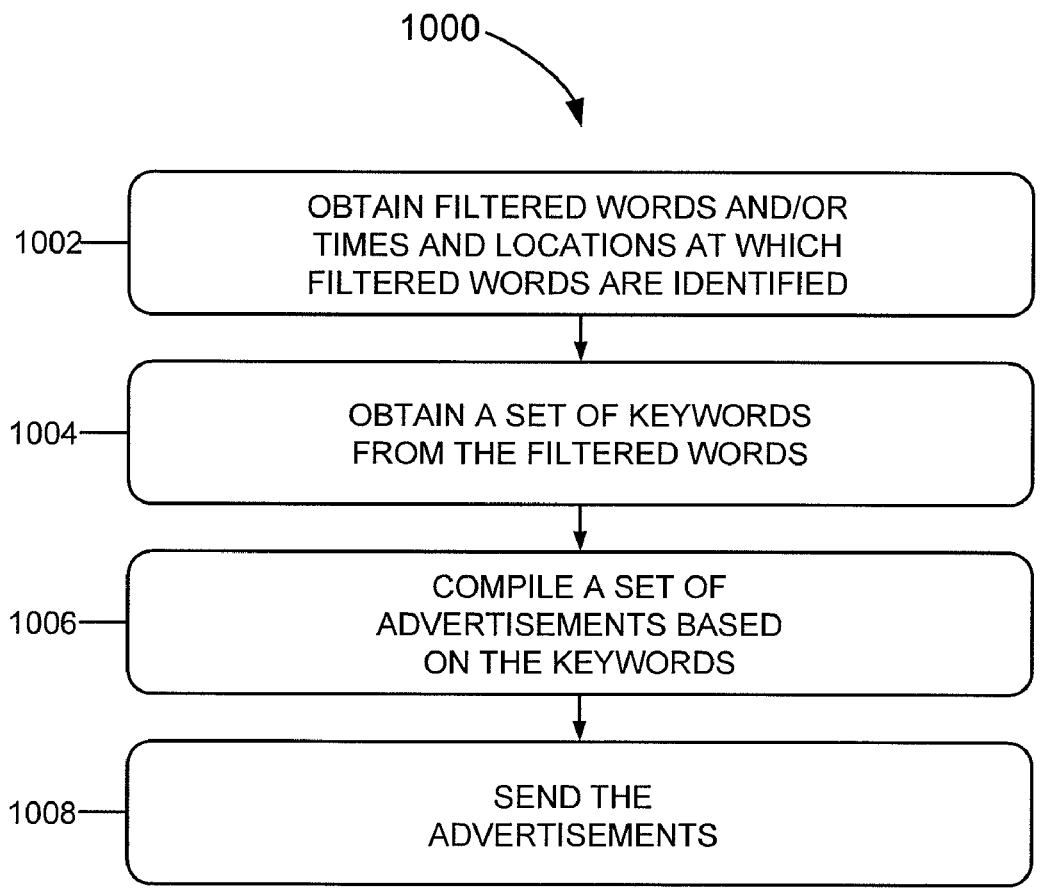
FIG. 10 is a flowchart of an exemplary process for providing advertisements that are tailored to a user based on the speech recognition.
Figure 11:
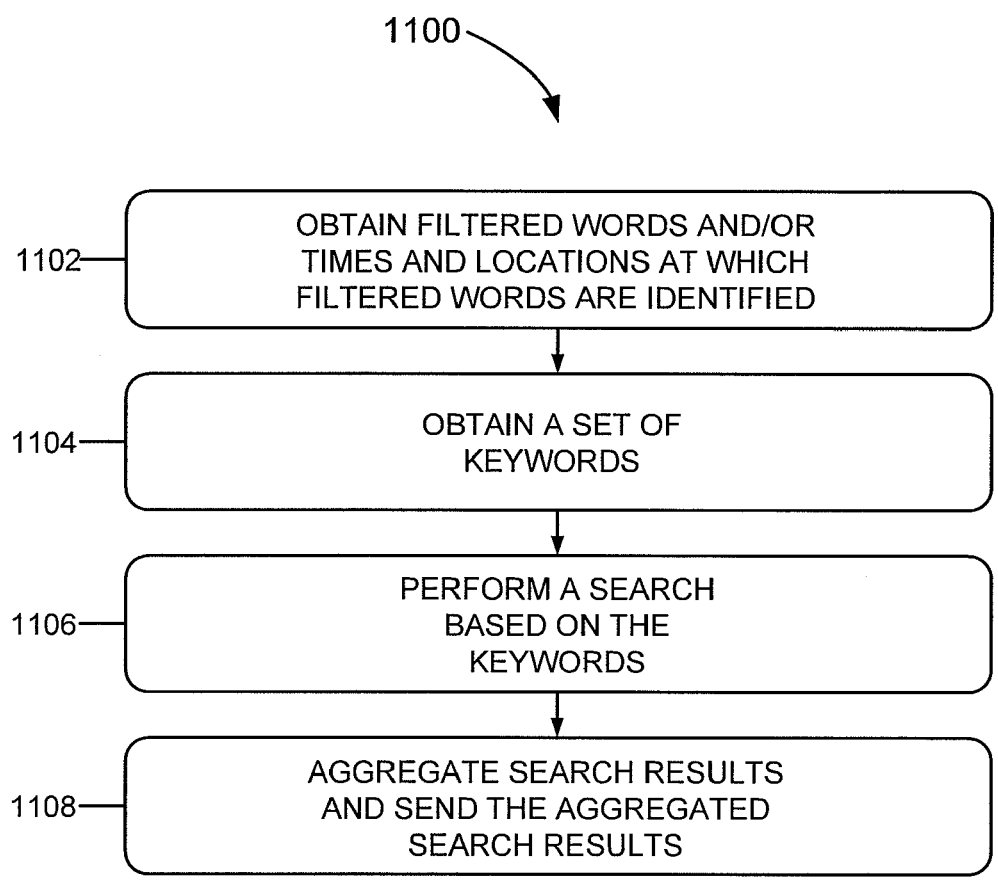
FIG. 11 is a flowchart of an exemplary process for providing search results that are tailored to a user based on the speech recognition.
Figure 12:
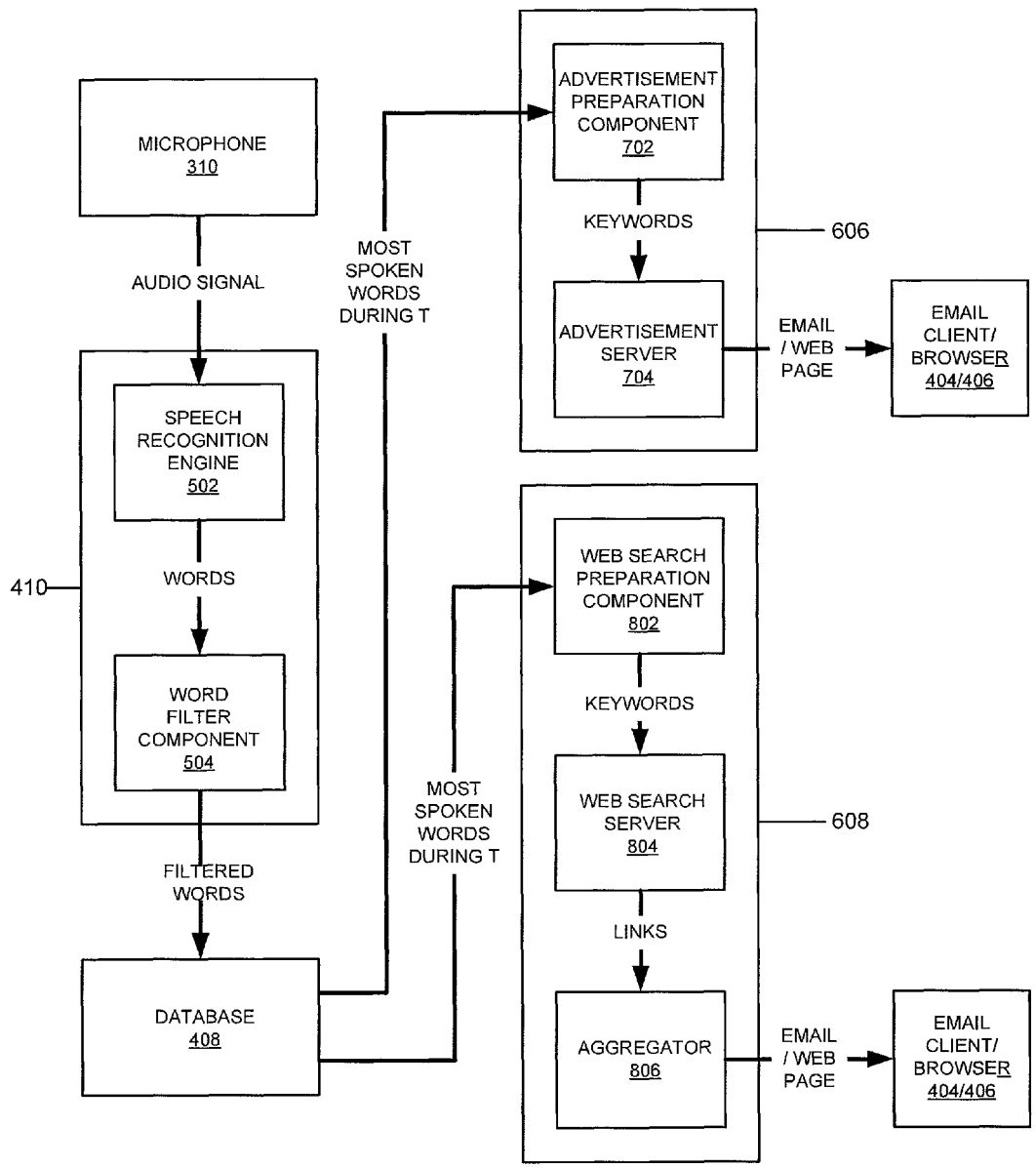
FIG. 12 illustrates a flow of data through some of the components of the client device and/or the server device of FIG. 1.

FIGS. 9-11 are flowcharts of exemplary processes that are associated with performing and using speech recognition. FIG. 12 shows a flow of data through some of the components of client device 102 and/or server device 104 as the exemplary processes of FIGS. 9-11 are performed.

FIG. 9 is a flowchart of an exemplary process 900 for performing speech recognition. The exemplary process 900 of FIG. 9 may be performed by personal word generation system 410 of client 102. In many implementations, personal word generation system 410 and/or instances of programs that are associated with personal word generation system 410 (e.g., a program for communicating with server device 104 to transfer information related to identified words in a speech) may run in a background, to avoid interfering with different uses of client device 102.

At block 902, audio signals may be received from a microphone (e.g., microphone 310). FIG. 12 shows an audio signal that flows from microphone 310 to speech recognition engine 502.

At block 904, speech recognition may be applied to user speech to identify words in the speech. As explained above, the speech recognition may be performed via, for example, neural networks, a Hidden Markov model, a DTW, etc. For each identified word, time and/or geographical location at which the identification occurs may be obtained. In FIG. 12, the identified words may be passed to word filter component 504 from speech recognition engine 502.

At block 906, the identified words may be filtered. In determining which words to retain, the identified words may be compared to a predetermined set of words that are stored in a database. In other implementations, commonly used words (e.g., prepositions, conjunctions, etc.) may be removed.

At block 910, the filtered words may be stored, along with the times and the locations at which the words are identified, in a database. Optionally, for each word, the number of times the word is identified may be stored and/or updated. FIG. 12 illustrates word filter component 504 sending the filtered words to database 408 to be stored.

FIG. 10 is a flowchart of an exemplary process 1000 for providing advertisements that are customized to a user based on speech recognition. The exemplary process 1000 of FIG. 10 may be performed by advertisement system 606 of server device 104. As shown, at block 1002, the filtered words and/or the times and locations at which the filtered words are identified may be obtained. Depending on implementation, the information may be obtained at client device 102 and/or server device 104. In one implementation, the information may be provided based on a schedule or an occurrence of an event (e.g., a predetermined number of words are recognized within a specified period of time). In another implementation, a subset of the information may be obtained in response to a database request from advertisement preparation component 702. FIG. 12 shows the transfer of the subset of the information, which may include most spoken words during a specified time period T, from database 408 to advertisement preparation component 702.

At block 1004, a set of keywords may be obtained from the filtered words. As described above in connection with FIG. 7, different criteria may be used to obtain the keywords. The keywords that are obtained, as illustrated in FIG. 12, may be sent from advertisement preparation component 702 to advertisement server 704.

At block 1006, advertisements may be compiled based on the keywords. Compiling advertisements may include searching for information (e.g., video, text, etc.) in a database (e.g., database 604) that match the keywords and combining the information. In yet another implementation, compiling an advertisement may include retrieving advertisements that best match the filtered words. The match may be based on locations and times associated with keywords as well as the keywords.

At block 1008, the compiled advertisements may be sent to a client device from which the filtered words are obtained. As described above, the advertisements may be sent as email messages, web pages, voice messages, video messages, and/or other forms of exchanging information. FIG. 12 shows sending the advertisements as an email message or a web page to email client 404 or browser 406.

In process 1000, because the advertisements are produced based on words that are spoken by a user of client device 102 and based on time/geographical information associated with the words, the advertisements that are of significant interest to the user may be delivered at an appropriate time and place. For example, if the user speaks much about purchasing a new computer one day, the user may receive advertisements from computer stores. Because the stored information may be purged gradually from client device 102, if the user talks a lot about redecorating a room the next day, the user may receive advertisements from furniture shops instead of from the computer stores.

FIG. 11 shows a flowchart of an exemplary process 1100 for providing search results that are tailored to a user based on speech recognition. The exemplary process of FIG. 11 may be performed by web search system of server device 104. As shown, at block 1102, the filtered words and/or the times and locations at which the filtered words are identified may be obtained in ways similar to those described above for block 1002. FIG. 12 shows the transfer of a subset of the filtered words, which may include most spoken words during a specified time period T, from database 408 to web search preparation component 802.

At block 1104, a set of keywords may be obtained from the filtered words. As described above with reference to FIG. 8, depending on implementation, different criteria may be used to obtain the keywords. As illustrated in FIG. 12, in one implementation, the keywords may be sent from web search preparation component 802 to web search server 804.

At block 1106, a search may be performed based on the keywords. In one implementation, the search may be performed using database 604. In another implementation, web search server 804 may submit a search request to a search engine in network 106 (FIG. 1). Results of the search may include links (e.g., URLs) or embedded content (e.g., text, article, picture, etc.), RSS feeds, etc. In FIG. 12, the search results are shown as links that are passed from web search server 804 to aggregator 806.

At block 1108, the search results may be aggregated and sent. The search result may be aggregated (i.e., combined) in one or more web pages, email messages, voice messages, video messages, and/or other forms of exchanging messages. The aggregated information may be sent to client device 102. FIG. 12 shows sending the search results as an email message or as a web page to email client 404 or browser 406. At client device 102, the received information may be displayed to a user in a menu, a user interface, etc. The received information may be discarded after a predetermined period.

Alternative Implementations

Many changes to the components and the processes described above for performing and using speech recognition may be implemented. In an alternative implementation, speech recognition engine 502 may be connected to logic that supplies sound signals to speakers. In such implementation, personal word generation system 410 may be placed in different types of devices with networking capabilities (e.g., a television with the ability to network, such as a cable television). If implemented in a phone-like device, speech recognition engine 502 may not only identify words that are uttered by a user of client device 102, but also words that are spoken by callers.

In another implementation, in addition to or in place of using speech recognition engine 502, an instant messaging word recognition engine that examines instant messages (e.g., incoming messages and/or outgoing messages) for significant terms may be used.

In FIGS. 6-8, advertisement preparation component 702 and/or web search preparation component 802 are shown as subcomponents of server device 104. In other implementations, advertisement preparation component 702 and/or web search preparation component 802 may be included in client device 102.

In still other implementations, word filter component 504 and/or word storing/retrieving unit 506 may be incorporated in server device 104. More generally, whether to include certain components in a client device or in a server device may depend on processing power, memory, and/or other factors related to client devices and server devices.

Example

Figure 13A:
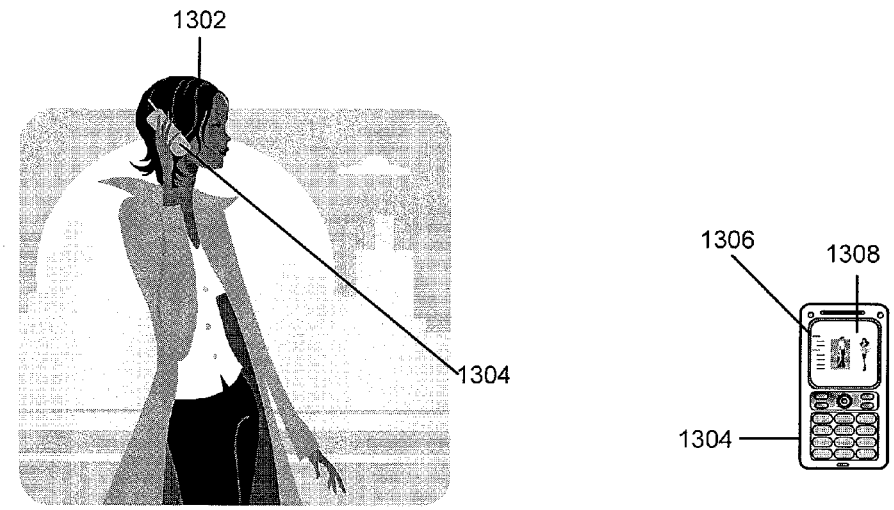
FIGS. 13A and 13B illustrate an exemplary scenario for using the speech recognition.
Figure 13B:
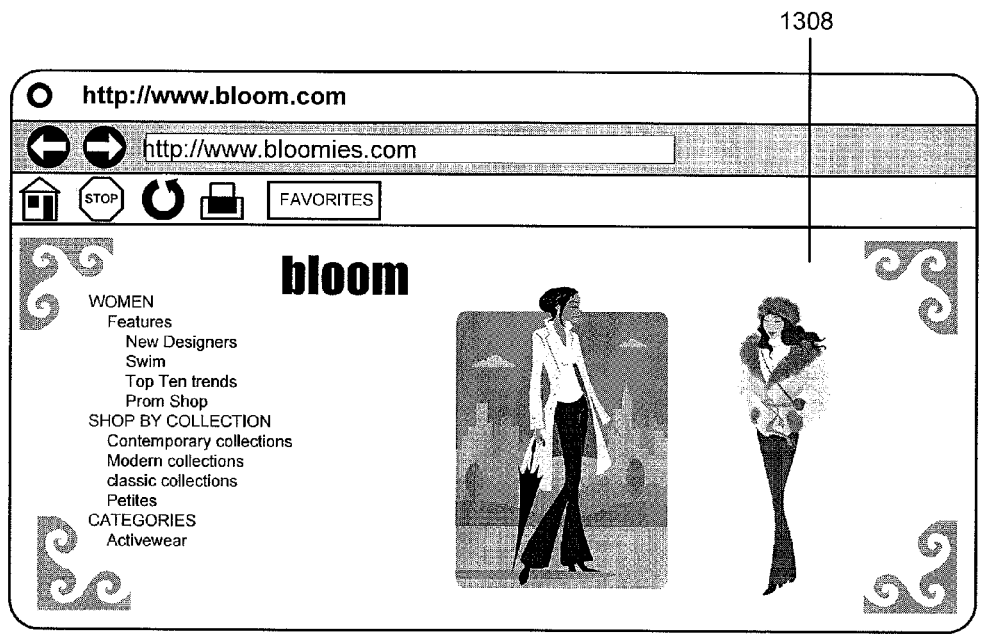

The following example illustrates processes that are involved in performing and using speech recognition to provide advertisements and search results, with reference to FIGS. 13A and 13B. The example is consistent with the exemplary processes described above with reference to FIGS. 9-11.

In the example, assume that Jane 1302 is talking to her friend Greta (not shown) on Tuesday at 2:00 p.m. In addition, assume that personal word generation system 410 (not shown) in client device 1304 is running in background. During Jane's conversation, Jane 1302 uses terms "bloom" and "shopping" multiple times.

In client device 1304, speech recognition engine 502 (not shown) receives audio signals from a microphone in client device 1304 and identifies words that are spoken by Jane 1302. The identified words are passed to word filter component 504 (not shown) in client device 1304 and filtered. Word filter component 504 filters the words and retains only two words, "bloom" and "shopping." Word storing/retrieving unit 506 (not shown) records the words, times at which "bloom" is identified (e.g., 2:05, 2:15, and 2:35 p.m.), and the times at which "shopping" is identified (e.g., 2:03, 2:12, and 2:37 p.m.). The geographical location is provided by positioning logic 412 in client device 1304 as Lund, Sweden, and stored in database 408 (not shown) in client device 1304.

Client device 1304 contacts a server device and sends words (e.g., words that are most spoken between 2:00 p.m. and 3:00 p.m.) and the chronological and geographical information associated with the words to the server device. At the server device, advertisement preparation component 702 (not shown) receives the words and produces keywords "Bloom," "shopping," "Lund," and "Sweden." Advertisement server 704 (not shown) uses the keywords to retrieve a web page advertisement about an outlet store called "Bloom" in Lund, Sweden. Advertisement server 704 includes a URL that points to the web page as a link in an email message and sends the email message to client device 1304.

In addition, at the server device, web search preparation component 802 (not shown) receives the words and produces keywords "Bloom" and "shopping." The keywords are used by web search server 804 (not shown) to submit a search query to a search engine that returns a list of URLs related to Bloom and shopping. Aggregator 806 includes the list of URLs in an email message and sends the email message to client device 1304.

At client device 1304, Jane 1302 discovers that she has one email message from the advertisement server 704 and another one from aggregator 806. Jane 1302 sees the email message from the advertisement server 704 on display 1306 of client device 1304, clicks on the URL link in the email message, and views advertisement page 1308, as illustrated in FIG. 13B.

Conclusion

The foregoing description of embodiments provides illustration, but is not intended to be exhaustive or to limit the embodiments to the precise form disclosed. Modifications and variations are possible in light of the above teachings or may be acquired from practice of the teachings.

For example, while series of blocks have been described with regard to processes illustrated in FIGS. 9-11, the order of the blocks may be modified. For example, block 906 may be performed while blocks 908-910 are being performed. Furthermore, non-dependent blocks in FIGS. 9-11 may represent blocks that can be performed in parallel to other blocks.

It will be apparent that aspects described herein may be implemented in many different forms of software, firmware, and hardware in the implementations illustrated in the figures. The actual software code or specialized control hardware used to implement aspects should not be construed as limiting. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A method comprising:
    monitoring a speech signal produced from utterances received via a microphone of a client device;
    identifying, by the client device, a plurality of terms contained in the speech signal,
    retaining, by the client device, one or more of the identified terms by comparing the identified terms to a set of filtering terms;
    storing, by the client device, corresponding information for each of the retained terms including:
        an indication of a number of the utterances of the retained term,
        chronological information recorded for each of the utterances, and
        geographical information determined for each of the utterances;
    sending, by the client device based on a request received from a remote device, a subset of the retained terms, based on and the corresponding information associated with the subset of the retained terms, to one or more components of the remote device; and
    receiving, by the client device, messages, related to one or more of the subset of the retained terms and related to the corresponding information associated with the one or more of the subset of the retained terms, from the one or more components of the remote device.

2. The method of claim 1, wherein retaining one or more of the identified terms includes:
    eliminating, from the plurality of terms, a word contained in the set of filtering terms.

3. The method of claim 1, wherein retaining one or more of the identified terms includes:
    retaining words in the plurality of terms when the words are among the set of filtering terms.

4. The method of claim 1, wherein sending a subset of the retained terms to the one or more components of the remote device includes:
    sending the times at which the subset of the retained terms are identified to the one or more components of the remote device.

5. The method of claim 1, wherein sending a subset of the retained terms to the one or more components of the remote device includes:
    sending the names of locations at which the subset of the retained terms are identified to the one or more components of the remote device.

6. The method of claim 1, wherein identifying the plurality of terms comprises processing the speech signal using speech recognition, including:
    using a Hidden Markov model to recognize words in the speech signal.

7. The method of claim 1, further comprising:
    storing the retained terms together with the corresponding information in a database of the client device.

8. The method of claim 7, further comprising:
    removing the retained terms and the corresponding information, from the database, after a predetermined period of time in the database.

9. The method of claim 1, wherein the one or more components comprises an ad server, and receiving messages includes:
    receiving advertisements related to the one or more of the subset of the retained terms and to at least some of the corresponding information associated with the one or more of the subset of the retained terms.

10. The method of claim 1, wherein the one or more components comprises an ad server and a search engine, and receiving messages includes:
    receiving, from the ad server and the search engine, email messages that include advertisements, links, or bookmarks that are related to the one or more of the subset of the retained terms and to at least some of the corresponding information associated with the one or more of the subset of the retained terms.

11. The method of claim 1, wherein the one or more components comprises a search engine, and receiving messages includes:
    receiving results of a search, with keywords, performed at the search engine, the keywords being related to the one or more of the retained terms and to at least some of the corresponding information associated with the one or more of the subset of the retained terms.

12. A client device comprising:
    a speech recognition engine that identifies terms, in a particular communication, received via a microphone, at the client device;
    a filter that filters one or more of the identified terms to obtain filtered terms;
    a database for recording information related to the filtered terms, including:
        multiple instances of one or more of the filtered terms in the particular communication,
        a time at which the one or more of the filtered terms occurs in the particular communication, and
        a geographical location of the client device during the particular communication;
    a storing unit that stores the filtered terms and the recorded information associated with the filtered terms;
    a processor to retrieve a subset of the filtered terms based on at least two of:
        the recorded multiple instances corresponding to the subset of the filtered terms,
        the recorded times corresponding to the subset of the filtered terms or
        the recorded geographical information for the subset of the filtered terms; and
    a communication interface to:
        send the subset of the filtered terms and the recorded information associated with the subset of the filtered terms, from the client device, to a remote device; and
        receive messages, related to one or more of the subset of the filtered terms and related to at least some of the recorded information associated with the one or more of the subset of the filtered terms, from the remote device.

13. The device of claim 12, wherein the filter includes at least one of:
- a filter that eliminates, among the identified terms, terms that match a predetermined set of terms; or
- a filter that retains, among the identified terms, terms that match a predetermined set of terms.

14. The device of claim 12, wherein the messages include:
- advertisements that are retrieved based on keywords that are derived from the one or more of the subset of the filtered terms; or
- results of performing a search based on keywords that are derived from the one or more of the subset of the filtered terms.

15. The device of claim 14, wherein the results of performing the search include at least one of a list of uniform resource locators or bookmarks.

16. The device of claim 12, wherein the messages include at least one of email messages, web pages, voice mails, or video messages.

17. The device of claim 12, wherein the processor is further to:
- remove the stored filtered terms and the recorded information associated with the stored filtered terms after a predetermined period of time.

18. The device of claim 12, wherein the speech recognition engine includes an instant message recognition engine.

19. A client device comprising:
- means for identifying a plurality of terms in a speech signal, received by the client device, during a monitored communication;
- means for retaining one or more of the identified terms by comparing the identified terms to a set of words;
- means for storing corresponding information, for each of the retained terms, including
  - a recorded number of occurrences during the monitored communication,
  - a recorded time, during the monitored communication, for each of the occurrences, and
  - one or more geographical locations of the client device during the monitored communication;
- means for sending particular ones of the retained terms and the corresponding information associated with the particular ones of the retained terms, to an advertisement server; and
- means for receiving, from the advertisement server, advertisements that are related to one or more of the particular ones of the retained terms and related to at least some of the corresponding information associated with the one or more of the particular ones of the retained terms.

20. The client device of claim 19, further comprising:
- means for receiving the speech signal, via a network, from another client device associated with the monitored communication.

* * * * *